March 19, 1957
C. G. MUNGER
2,785,910
MOLDED JOINT FOR PLASTIC TUBES WITH LATCH
Filed May 5, 1955
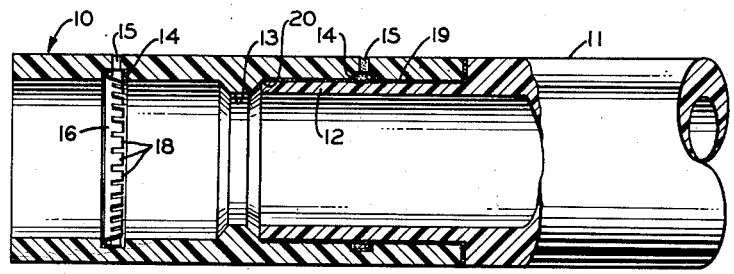
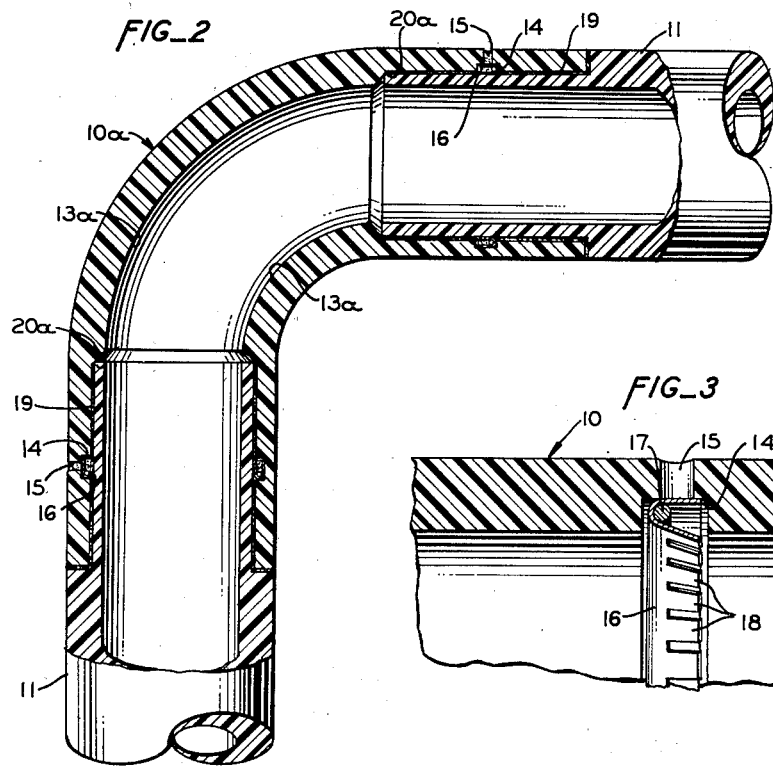
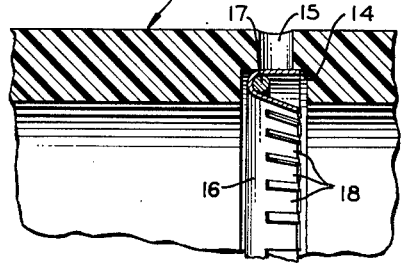
INVENTOR.
CHARLES G. MUNGER
BY
*Mellin and Hanscom*
ATTORNEYS

United States Patent Office 2,785,910
Patented Mar. 19, 1957

2,785,910
MOLDED JOINT FOR PLASTIC TUBES WITH LATCH

Charles G. Munger, San Gabriel, Calif., assignor to Amercoat Corporation, South Gate, Calif., a corporation of California Application May 5, 1955, Serial No. 506,192

2 Claims. (Cl. 285—22)

This invention relates to a pipe joint, and more particularly pertains to a pipe joint for use in coupling lengths of plastic pipe and/or reinforced plastic pipe.

It is the principal object of this invention to provide a novel joint for joining together two lengths of plastic pipe.

A further object of the invention is to provide a pipe joint for plastic pipe wherein a spring catch member is provided to hold the two pipe elements together in coaxial overlapping alignment while an adhesive is forced between the two elements to tightly bond the two elements together.

A preferred embodiment of the invention is described in the following detailed specification and illustrated by way of example in the accompanying drawings, wherein:

Fig. 1 illustrates a pipe joint embodying the principles of the invention.

Fig. 2 illustrates the principles of the joint shown in Fig. 1 as applied to an elbow connection.

Fig. 3 is an enlarged fragmentary view showing the details of the spring catch member.

Referring now to the drawings, wherein similar reference numerals are used to denote the same elements throughout the various views shown, and referring more particularly to Fig. 1 thereof, 10 generally indicates a straight pipe coupling adapted to connect two lengths of pipe 11, only one of which is shown. The pipe 11 is provided with a reduced external diameter end portion 12 which is slidably received within the end of the coupling member 10. The coupling member 10 is provided with a centrally located inwardly extending annular flange 13 against which the end portion 12 of the pipe 11 abuts. The outer faces of the flange 13 are each beveled inwardly in the manner shown at 20 to aid in centering the end portion 12 of the pipe 11 within the coupling 10. An annular groove 14 is cut into the inner surface of the coupling 10 between the flange 13 and the end of the coupling. A bore 15 connects the annular groove 14 with the exterior of the coupling. Adhesive 19 is pumped inwardly through the bore 15 and completely fills the annular space between the pipe end 12 and the interior wall of the coupling 10.

As best seen in Fig. 3, an annular spring catch member 16 is mounted in the groove 14. The member 16 is V-shaped in cross section and is placed in the groove 14 with one side flush with the bottom of the groove and the other side extending diagonally inwardly toward the center of the coupling member 10. A wire 17 is confined between the sides of the V-shaped member 16 adjacent the pointed end thereof to urge the sides toward their extended relation. The inwardly extending side of the V-shaped member 16 is notched to provide a plurality of inwardly extending catch fingers 18 which bite into the surface of the end portion 12 of the pipe 11 to prevent withdrawal thereof once the pipe is inserted in the coupling 10. The fingers 18 also aid in centering the pipe end 12 within the coupling 10.

While the joint is shown here as incorporated in a separate sleeve member adapted to join two lengths of pipe having similar reduced end portions, it is obvious that by making the sleeve larger, the reduction of the pipe ends would not be necessary. It is further obvious that the pipe section could be prepared with one end counterbored and the other end reduced whereby the pipe lengths could be joined without requiring a separate sleeve.

The modification in Fig. 2 shows a similar joint applied to an elbow fitting 10a. The elements shown herein are the same as shown in Fig. 1 with the exception that the central flange 13a is elongated and arcuate to provide two end portions at 90° to each other, each of said end portions being beveled inwardly as indicated at 20a. In view of this showing, it is obvious that the pipe joint may be applied to T, Y, or other common types of pipe connections.

While I have shown and described the preferred form of my invention, it is obvious that various changes may be made in its construction by those skilled in the art, without departing from the spirit of the invention as defined in the appended claims.

Having thus described my invention, what I claim and desire to secure by Letters Patent is:

1. A joint for connecting together two tubular plastic members comprising a tubular plastic coupling member having an open end, an inwardly extending annular flange formed on the inner wall of said coupling member remote from said end, said flange having an outer face slanting toward said open end and forming an obtuse angle with the inner wall of said coupling member, a tubular plastic pipe member having one end adapted to be inserted within said coupling member to abut the slanting face of said flange whereby the one end of said pipe member may be centered within said coupling member, said pipe member having an external diameter sufficiently less than the inner diameter of said coupling member so as to form an annular space therebetween, means forming an annular groove in said coupling member between the open end thereof and said flange, an annular spring catch member disposed within said groove, said annular catch member having a plurality of teeth extending inwardly and away from the end of said coupling member, said teeth being adapted to bite into the outer wall of said pipe member to prevent withdrawal thereof after insertion into said coupling member, said teeth being also adapted to center the pipe member within said coupling member, a plastic adhesive binding the whole of the inserted end of said pipe member to said coupling member and means forming a radial port through said coupling member through which said plastic adhesive may be forced to flow into said annular groove and said annular space between said pipe member and said coupling member.

2. The device as set forth in claim 1, wherein the contact points of said catch member with said pipe member are located between said open end of said coupling member and said radial port in respect to the flow of said adhesive through said radial port.

References Cited in the file of this patent

UNITED STATES PATENTS

| | | |
|---|---|---|
| 1,248,362 | McWane | Nov. 27, 1917 |
| 1,722,324 | Deming | July 30, 1929 |
| 1,742,211 | Lally | Jan. 7, 1930 |
| 2,038,869 | Rader | Apr. 28, 1936 |
| 2,038,870 | Rader et al. | Apr. 28, 1936 |
| 2,209,235 | Nathan | July 23, 1940 |
| 2,313,074 | Jewell | Mar. 9, 1943 |
| 2,360,314 | Calder | Oct. 17, 1944 |
| 2,456,203 | Loepsinger | Dec. 14, 1948 |
| 2,484,192 | Squiller | Oct. 11, 1949 |

FOREIGN PATENTS

| | | |
|---|---|---|
| 76,215 | Denmark | July 27, 1953 |
| 988,756 | France | May 9, 1951 |
| 256,525 | Great Britain | Aug. 12, 1926 |